United States Patent [19]

Buros

[11] 4,278,880

[45] Jul. 14, 1981

[54] EXTENDED CLEAR BAND CARRIER-STRIP

[76] Inventor: Melvin S. Buros, P.O. Box 6495, Phoenix, Ariz. 85005

[21] Appl. No.: 113,450

[22] Filed: Jan. 21, 1980

[51] Int. Cl.³ .................... G06K 19/00; G06K 19/06
[52] U.S. Cl. ................................. 235/493; 235/487
[58] Field of Search ...................... 235/487, 493, 462

[56] References Cited

U.S. PATENT DOCUMENTS

| | | | |
|---|---|---|---|
| 3,431,404 | 3/1969 | Brink | 235/493 |
| 3,576,972 | 5/1971 | Wood et al. | 235/493 |
| 3,593,913 | 7/1971 | Bremer | 235/487 |
| 3,666,926 | 5/1972 | Conte, Jr. et al. | 235/487 |
| 3,702,924 | 11/1972 | Wood et al. | 235/493 |
| 3,770,943 | 11/1973 | Sill | 235/487 |
| 4,060,711 | 11/1977 | Buros | 235/493 |

*Primary Examiner*—Robert M. Kilgore
*Attorney, Agent, or Firm*—Cahill, Sutton & Thomas

[57] ABSTRACT

An extended clear band strip is disclosed for attachment to a document to permit re-encoding of information on the extended clear band. The device incorporates an elongated rectangular backing member having a predetermined width and having a coating of pressure sensitive adhesive thereon; an elongated rectangular indicia receiving release paper member is secured in abutting contact with a release paper strip member. The strip member and the indicia receiving member, although constructed of release paper, incorporate surfaces that are receptive to encoding inks. The strip member may be removed to expose the pressure sensitive adhesive therebeneath and thus permit the attachment of the extended clear band along one of the longer edges of a document. The adhesively coated side of the backing member is formed of a contrasting color with respect to the indicia receiving member.

3 Claims, 4 Drawing Figures

U.S. Patent    Jul. 14, 1981    4,278,880
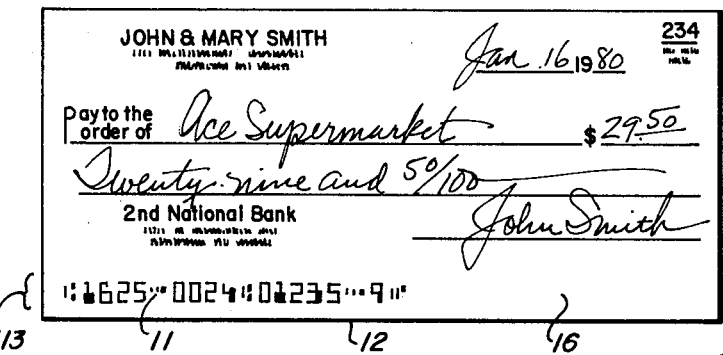
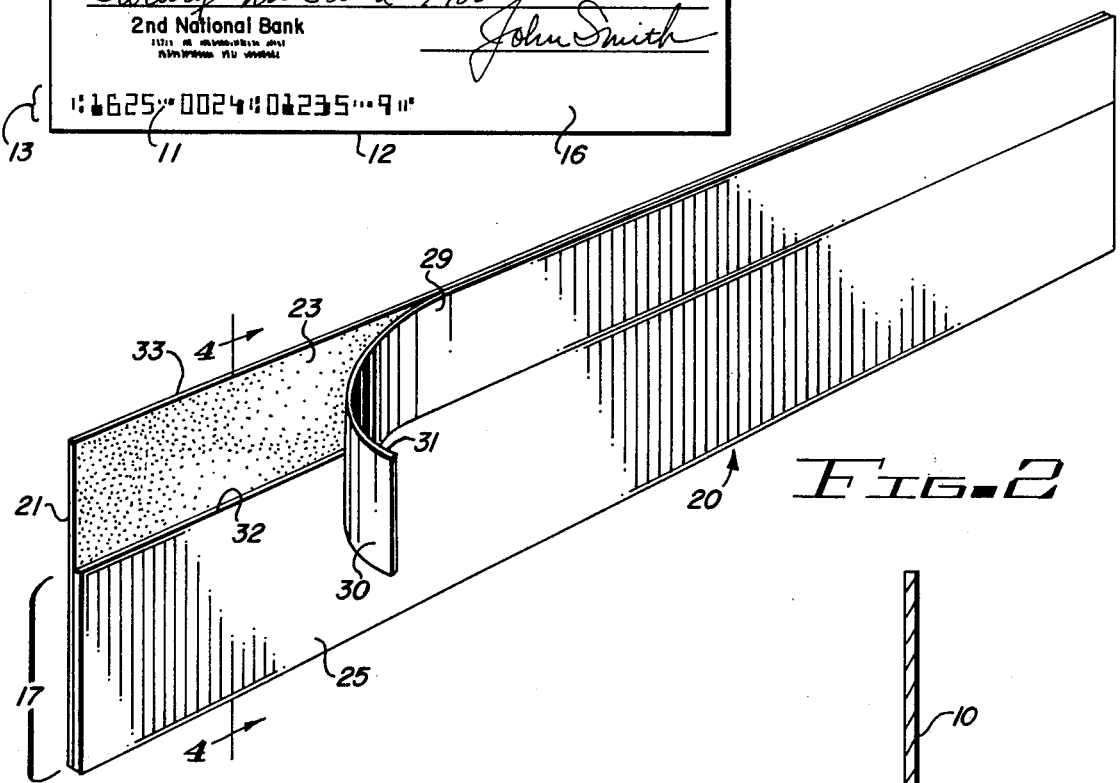
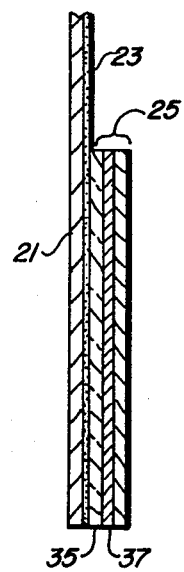
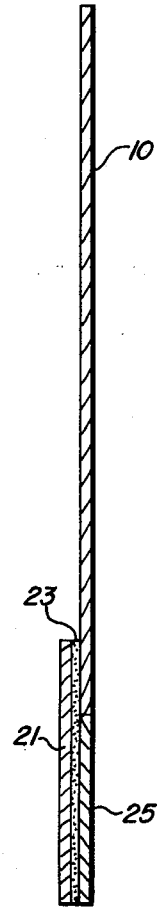

EXTENDED CLEAR BAND CARRIER-STRIP

BACKGROUND OF THE INVENTION

The present invention relates to devices to facilitate the re-encoding of characters on a document and, more particularly, to an extended clear band device for attachment to a misencoded document to permit proper reading of the characters by machine reading equipment.

The utilization of magnetic ink character recognition (MICR) characters on documents, such as bank checks, has become a relatively standard technique to implement mechanization of reading such documents through machine reading devices known as reader/sorters. The MICR characters must comform not only to particular specifications with respect to the characters themselves, but also must be placed in a predetermined location on the document to be machine read. The location of such characters is characteristically referred to, in the banking industry for example, as the "clear band". The clear band is typically a band extending parallel to the bottom edge of the document that is reserved for the receipt of such characters. When characters are placed in this band, they are thus properly positioned with respect to the bottom edge of the document so that they pass the read heads of the reader/sorter equipment. The length of the clear band is also usually designated in accordance with specific specifications defined by the industry utilizing the MICR character system. For example, the American Bankers Association promulgates rigid specifications to permit checks and other similar documents to be machine read.

The information contained in this "clear band" will usually include identification of an account, a bank and its branch, and the amount indicated on the check by the payor. Some of this information (i.e., account number and bank/branch identification) is pre-printed; that is, the information is placed on the checks before they are distributed to the bank's customer. Other information (the amount) is post-encoded; that is, after the check has been presented to the bank, the amount indicated on the check by the customer is encoded in the clear band by the bank.

In some instances, the reader/sorters fail to properly read the document. The reasons for such inability to read are numerous and can include such things as poor quality character printing and the like. Further, in some instances the post-encoded amount may be erroneous and the amount therefore must be corrected before the document is to be read.

There are various corrections techniques utilized by the industry to provide a means for re-encoding the document so that the information is properly fed into the reader/sorter. These techniques include removing the post-encoding from the document chemically and re-encoding the document (a technique that does not work well with the pre-printed or pre-encoded characters), carrier documents (envelope-like structures in which the document is inserted and the information encoded on the outside of the envelope), labels (usually placed over the erroneously encoded characters and which receive the re-encoding on top of the label), and extended clear band devices. The present invention relates to the latter technique.

Prior art extended clear band techniques require that the device be made out of homologous sulphide-type paper stock suitable for receiving MICR inks or impressions from magnetic transfer ribbons. To provide a suitable surface for receiving such inks, it is important that the paper be receptive to the inks to permit proper adhesion of the inks without the formation of voids or irregularities in the character. These extended clear band strips are usually pattern coated with some sort of adhesive along an upper horizontal edge of the strip. The adhesive is normally covered with a protective release paper which is subsequently removed to expose the adhesive and permit the contact of the adhesive with the back surface of the document along the bottom edge. The strip of paper beneath the adhesive pattern is thus exposed along the bottom edge of the document to form the "extended clear band" to receive the re-encoded MICR characters.

Such manually applied extended clear bands are difficult to position properly; for example, the bottom edge of the extended clear band is sometimes not parallel to the bottom edge of the repaired document. In the latter event, some of the adhesive is exposed, resulting in "piggy-backing". The latter phrase is typically used to indicate that two documents have become stuck together and are carried through the transport mechanism of the reader/sorter to cause jams. Further, when the bottom edge of the extended clear band is not parallel to the bottom edge of the document, the document may frequently be transported out of line past the read heads of the reader/sorter, thus causing a reject. The difficulties with the manual application of extended clear bands can be alleviated through the utilization of machine application; however, the acquisition and maintenance of a machine to apply extended clear bands is not justified when the volume of documents being handled is not large. Thus, the smaller organization with a lower volume of documents must either put up with the difficulties of prior art extended clear band devices or must seek alternatives. Further, prior art extended clear band strips require expensive pattern application of adhesives which render the extended clear bands relatively expensive.

Other techniques have been suggested, such as the use of heat sensitive adhesives for attachment of the extended clear band to a document, coupled with a provision for tearing or removing the extended clear band from the document (see for example U.S. Pat. No. 3,770,942). Such techniques require equipment for heat sealing and therefore increase the complexity (and the cost) of the use of such devices.

It is therefore an object of the present invention to provide an extended clear band that is inexpensive to manufacture and may nevertheless permit easy and accurate attachment to a document.

It is still another object of the present invention to provide an extended clear band utilizing pressure sensitive adhesives wherein the release paper forms the character receiving surface of the extended clear band.

It is a further object of the present invention to provide an extended clear band that facilitates accurate positioning on a document by providing both a straight edge for abutment with a document edge and a contrasting color between an adhesively coated backing member and an indicia receiving release paper.

These and other objects of the invention will become apparent to those skilled in the art as the description thereof proceeds.

Briefly, and in accordance with an embodiment chosen for illustration, an extended clear band device is constructed having a backing member formed of a conventional high density kraft paper coated with a pressure sensitive adhesive. Two release paper strips are secured to the adhesive side of the backing member, the first of which is removed to expose the underlying adhesive and the other of which remains adhesively secured to the backing member to provide both an abutting edge for contact with the lower edge of the document and an indicia receiving surface for receiving re-encoded information. The release paper is provided with a contrasting color with respect to the adhesive coated side of the backing member. Normally, the release paper will be provided with a white surface, while the underlying adhesively coated backing member will appear brown.

The present invention may more readily be described with reference to the accompanying drawings in which:

FIG. 1 is an illustration of a document with which the extended clear band of the present invention may be used.

FIG. 2 is a perspective view of an extended clear band constructed in accordance with the teachings of the present invention.

FIG. 3 is a side elevational view illustrating the extended clear band of the present invention mounted on the document of FIG. 1.

FIG. 4 is an enlarged cross-sectional view of a portion of the extended clear band of FIG. 2 taken along lines 4—4.

Referring to the drawings, a document such as that shown at 10 intended for use with MICR characters 11, incorporates a clear band 13 extending across the bottom of the document, the specifications of which may be determined in accordance with a particular industry standard such as that promulgated by the American Bankers Association. The MICR characters 11 are preprinted or post-printed within the clear band so that the characters may be presented to the read head of a reader/sorter as the document is fed through the machine. In the event that the MICR characters 11 are for any reason unreadable by the equipment, or in the event there is a misencoding, such as the encoding that is to be placed in the space 16 provided for the post-encoding of the dollar amount, the extended clear band of the present invention may be used.

The extended clear band 20 shown in FIG. 2 incorporates a backing member 21 coated with a pressure sensitive adhesive 23. An elongated rectangular indicia receiving release paper 25 is adhesively secured to the backing member 21 and is provided with a width 17 corresponding to the clear band width 13 of the document. An elongated rectangular strip member 29 is releaseably secured to the pressure sensitive adhesive on the backing member 21 and is provided with one of a longer edges 30 thereof in abutting contact with the longitudinally extending edge 32 of the indicia receiving member 25. The upper edge 31 of the strip member 29 is coterminous with the upper edge 33 of the backing member 21.

It is important to note that contrary to the usual use of pressure sensitive adhesive coated papers, the indicia receiving member 25 is formed of a release paper and provides the surface upon which the re-encoded MICR characters are placed. When the strip member 29 is peeled off of the adhesive coating 23 on the backing member 21, a contrasting color is presented to the user; that is, a contrasting color is presented between the adhesively coated side of the backing member 21 and the indicia receiving member 25. As a result, the positioning of the extended clear band on the document is greatly facilitated as will be described.

In use, the strip member 29 is peeled from the adhesive coating 23 on the backing member 21 to expose the longitudinal edge 32 of the indicia receiving member 25. The longitudinal edge 32 provides an abutting edge for contact with the lower edge 12 of the document 10. The combination of the abutting edge 32 and the contrasting color between the indicia receiving member 25 and the adhesive coated side of the backing member 21 enables the user to accurately align the document with the extended clear band and prevent exposure of the adhesive coating 23 between the extended clear band and the document (thus avoiding piggy-backing, as described previously).

When extended clear band 20 has been mounted on the document as shown in FIG. 3, it may be noted that a new extended clear band is provided by the combination such that the new encoding placed on the indicia receiving member 25 is properly positioned with respect to the read head of the reader/sorter machine.

Referring to FIG. 4, the backing member 21 is formed of a conventional natural high density kraft paper; the color of such paper is usually sufficient to provide the contrasting color appearance with respect to the indicia receiving member 25. The pressure sensitive adhesive coating 23 may be formed of conventional rubber base adhesive readily available in the label industry. The indicia receiving member 25 must be formed of a material that will readily accept and retain the magnetic inks used in MICR character systems. It has been found that conventional 60 pound litho paper provides a suitable surface for the receipt and retention of the MICR characters. Since the indicia receiving member 25, as well as the strip member 29, are actually a "release" paper, the sides of those members toward the adhesive 23 must be treated. Accordingly, a conventional silicone polymer 35 may be used to provide the easily removable contacting surface necessary for the release paper to readily be removed from the adhesive.

Release coatings or compounds such as the silicone polymer coating 35 may interfere with the ability of the indicia receiving member 25 to receive and retain the MICR inks if the release compound contacts the indicia receiving surface or if the polymer bleeds through the release paper to the ink receiving surface. Therefore, a preliminary or barrier coating 37, which may be a clay-based paper coating, is placed on the litho paper prior to application of the silicone polymer to form the indicia receiving member 25. A very thin polyethylene membrane may be used in lieu of the coating 37 to prevent the silicone from the layer 35 from being drawn by capillary action through the paper. There are various well known conventional techniques that may be used to apply the polyethylene as well as well known techniques for ensuring the adhesion of the silicone polymer layer 35 to the polyethylene.

It may therefore be seen that the release paper performs the function of receiving the re-encoding rather than the usual function of a release paper (i.e., merely protecting the adhesive coating, and to be removed and discarded prior to use).

I claim:

1. An extended clear band for facilitating the re-encoding of documents, said documents having a rectangular shape and having an encoding receiving clear band on one face extending along one of the longer edges thereof comprising:
- (a) an elongated rectangular backing member of natural high density kraft paper having a predetermined width and having a coating of rubber base pressure sensitive adhesive on one side thereof for contacting and supporting a strip member and an indicia receiving member;
- (b) an elongated rectangular indicia receiving release paper member having one of the longer edges thereof in contact with said pressure sensitive adhesive and extending along said backing member, and having a width less than said predetermined width, said longer edge adapted for abutting contact with said strip member and with said document;
- (c) an elongated rectangular release paper strip member releaseably secured to said pressure sensitive adhesive on said backing member and having one of the longer edges thereof in abutment with said one of the longer edges of said indicia receiving member, the other of the longer edges of said strip member being coterminous with one of the longer edges of said backing member, said strip member having a width less than said predetermined width;
- (d) said indicia receiving member having a contrasting color with respect to the adhesive coated side of said backing member;
- (e) said release paper strip member and said release paper indicia receiving member being formed from successive layers of encoding receiving litho paper, a barrier coating to prevent release compounds from being drawn into the encoding receiving paper, and a silicone polymer release layer;

whereby, said strip member may be removed to expose said pressure sensitive adhesive and permit the attachment of said extended clear band along the longer edge of said document adjacent said encoding and with said document edge in abutting contact with said one of the longer edges of said indicia receiving member.

2. An extended clear band for facilitating the re-encoding of documents, said documents having a rectangular shape and having an encoding receiving clear band on one face extending along one of the longer edges thereof comprising:
- (a) an elongated rectangular backing member having a predetermined width and having a coating of pressure sensitive adhesive on one side thereof for contacting and supporting a strip member and an indicia receiving member;
- (b) an elongated rectangular indicia receiving release paper member having one of the longer edges thereof in contact with said pressure sensitive adhesive and extending along said backing member, and having a width less than said predetermined width, said longer edge adapted for abutting contact with said strip member and with said document;
- (c) an elongated rectangular release paper strip member releaseably secured to said pressure sensitive adhesive on said backing member and having one of the longer edges thereof in abutment with said one of the longer edges of said indicia receiving member, said strip member having a width less than said predetermined width; and
- (d) said release paper strip member and said release paper indicia receiving member formed from successive layers of encoding receiving litho paper, a barrier coating to prevent release compounds from being drawn into the encoding receiving paper, and a silicone polymer release layer;

whereby, said strip member may be removed to expose said pressure sensitive adhesive and permit the attachment of said extended clear band along the longer edge of said document adjacent said encoding and with said document edge in abutting contact with said one of the longer edges of said indicia receiving member.

3. An extended clear band for facilitating the re-encoding of documents, said documents having a rectangular shape and having an encoding receiving clear band on one face extending along one of the longer edges thereof comprising:
- (a) an elongated rectangular backing member having a predetermined width and having a coating of pressure sensitive adhesive on one side thereof for contacting and supporting a strip member and an indicia receiving member;
- (b) an elongated rectangular indicia receiving release paper member having one of the longer edges thereof in contact with said pressure sensitive adhesive and extending along said backing member, and having a width less than said predetermined width, said longer edge adapted for abutting contact with said strip member and with said document;
- (c) an elongated rectangular release paper strip member releaseably secured to said pressure sensitive adhesive on said backing member and having one of the longer edges thereof in abutment with said one of the longer edges of said indicia receiving member, said strip member having a width less than said predetermined width;
- (d) said release paper strip member and said release paper indicia receiving member formed from successive layers of encoding receiving litho papers, a barrier coating to prevent release compounds from being drawn into the encoding receiving paper, and a silicone polymer release layer; and
- (e) said indicia receiving member having a contrasting color with respect to the adhesive coated side of said backing member;

whereby, said strip member may be removed to expose said pressure sensitive adhesive and permit the attachment of said extended clear band along the longer edge of said document adjacent said encoding and with said document edge in abutting contact with said one of the longer edges of said indicia receiving member.

* * * * *